(12) United States Patent
Lim et al.

(10) Patent No.: US 11,063,296 B2
(45) Date of Patent: Jul. 13, 2021

(54) ELECTROLYTE ADDITIVE AND NON-AQUEOUS ELECTROLYTE SOLUTION FOR LITHIUM SECONDARY BATTERY COMPRISING THE SAME

(71) Applicant: LG Chem, Ltd., Seoul (KR)

(72) Inventors: Young Min Lim, Daejeon (KR); Chul Haeng Lee, Daejeon (KR); Kyung Mi Lee, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/339,537

(22) PCT Filed: Jul. 3, 2018

(86) PCT No.: PCT/KR2018/007530
§ 371 (c)(1),
(2) Date: Apr. 4, 2019

(87) PCT Pub. No.: WO2019/009595
PCT Pub. Date: Jan. 10, 2019

(65) Prior Publication Data
US 2019/0245244 A1 Aug. 8, 2019

(30) Foreign Application Priority Data

Jul. 3, 2017 (KR) .................. 10-2017-0084345
Jul. 2, 2018 (KR) .................. 10-2018-0076420

(51) Int. Cl.
| | |
|---|---|
| *H01M 10/0567* | (2010.01) |
| *H01M 10/0568* | (2010.01) |
| *H01M 10/0569* | (2010.01) |
| *H01M 10/052* | (2010.01) |
| *C07F 9/20* | (2006.01) |
| *C07F 9/08* | (2006.01) |
| *H01M 10/0525* | (2010.01) |

(52) U.S. Cl.
CPC ........... *H01M 10/0567* (2013.01); *C07F 9/20* (2013.01); *H01M 10/052* (2013.01); *H01M 10/0568* (2013.01); *H01M 10/0569* (2013.01); *C07F 9/08* (2013.01); *H01M 10/0525* (2013.01); *H01M 2300/0025* (2013.01)

(58) Field of Classification Search
CPC ........... H01M 10/0567; H01M 10/052; H01M 10/0568; H01M 10/0569; H01M 10/0525; H01M 2300/0025; C07F 9/20; C07F 9/08; Y02E 60/10
See application file for complete search history.

(56) References Cited

U.S. PATENT DOCUMENTS

| | | |
|---|---|---|
| 3,449,473 A | 6/1969 | Roesky |
| 2010/0183926 A1 | 7/2010 | Kim et al. |
| 2011/0229770 A1* | 9/2011 | Yun ............... H01M 10/052 429/326 |
| 2012/0070750 A1 | 3/2012 | Blanc et al. |
| 2013/0323605 A1 | 12/2013 | Yamamoto et al. |
| 2014/0255793 A1 | 9/2014 | Zhang et al. |
| 2015/0206664 A1 | 7/2015 | Taki et al. |
| 2016/0190644 A1 | 6/2016 | Takase et al. |
| 2016/0315351 A1 | 10/2016 | Kotou et al. |
| 2017/0077551 A1 | 3/2017 | Kishi et al. |
| 2018/0277900 A1 | 9/2018 | Abe et al. |

FOREIGN PATENT DOCUMENTS

| | | |
|---|---|---|
| EP | 3086397 A1 | 10/2016 |
| JP | 2000215911 A | 8/2000 |
| JP | 2001319685 A | 11/2001 |
| JP | 2004221054 A | 8/2004 |
| JP | 2008287965 A | 11/2008 |
| JP | 2010170991 A | 8/2010 |
| JP | 2011192632 A | 9/2011 |
| JP | 2012069513 A | 4/2012 |
| JP | 2012238524 A | 12/2012 |
| JP | 2015225749 A | 12/2015 |
| KR | 20140009306 A | 1/2014 |
| KR | 20150039745 A | 4/2015 |
| KR | 20150128569 A | 11/2015 |
| KR | 20160079620 A | 7/2016 |
| WO | 2012120597 A1 | 9/2012 |
| WO | 2017057588 A1 | 4/2017 |

OTHER PUBLICATIONS

Machine translation of JP 2000-215911, retrieved from www.espacenet.com on Sep. 17, 2020.*
H.R.Kricheldorf et al. "Synthesis of flame-retardant poly(phenyl phosphonate)s from silylated biphenyldiols and diphenols", Makromolekulare Chemie, Rapid Communications, vol. 9, No. 4, Apr. 1, 1988, pp. 217-222, XP000020464.
Partial Supplementary European Search Report including Written Opinion for Application No. EP18828080.4 dated Dec. 5, 2019.
Takeda S, Morimura W, Liu YH, Sakai T, Saito Y. Identification and formation mechanism of individual degradation products in lithium-ion batteries studied by liquid chromatography/electrospray ionization mass spectrometry and atmospheric solid analysis probe mass spectrometry. Rapid Communications in Mass Spectrometry. Aug. 15, 2016;30 (15)1754-62.
International Search Report for PCT/KR2018/007530 dated Sep. 27, 2018.

\* cited by examiner

*Primary Examiner* — Cynthia K Walls
(74) *Attorney, Agent, or Firm* — Lerner, David, Littenberg, Krumholz & Mentlik, LLP

(57) ABSTRACT

The present invention relates to a non-aqueous electrolyte solution additive, and a non-aqueous electrolyte solution for a lithium secondary battery and a lithium secondary battery which comprise the same, wherein, specifically, since the non-aqueous electrolyte solution, which comprises a compound capable of maintaining a passive effect by increasing an effect of forming a solid electrolyte interface (SEI) on surfaces of a positive electrode and a negative electrode, is provided, high-temperature storage characteristics and life characteristics of the lithium secondary battery may be improved.

20 Claims, No Drawings

ELECTROLYTE ADDITIVE AND NON-AQUEOUS ELECTROLYTE SOLUTION FOR LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2018/007530 filed Jul. 3, 2018, which claims priority from Korean Patent Application No. 10-2018-0076420 filed Jul. 2, 2018 and Korean Patent Application No. 10-2017-0084345 filed Jul. 3, 2017, all of which are incorporated herein by reference.

TECHNICAL FIELD

The present invention relates to an electrolyte additive capable of improving performance of a battery and a non-aqueous electrolyte solution for a lithium secondary battery comprising the same.

BACKGROUND ART

As the miniaturization and weight reduction of electronic devices are realized and the use of portable electronic devices is common, research into secondary batteries having high energy density, as power sources of these devices, has been actively conducted.

The secondary battery comprises a nickel-cadmium battery, a nickel-metal hydride battery, a nickel-hydrogen battery, and a lithium secondary battery, and, among these batteries, research into lithium secondary batteries, which not only exhibit a discharge voltage two times or more higher than a typical battery using an aqueous alkaline solution, but also have high energy density per unit weight and are rapidly chargeable, has been emerged.

A current collector is coated with a positive electrode active material or negative electrode active material of appropriate thickness and length or the active material itself is coated in the form of a film, and the resultant product is then wound or stacked with an insulating separator to prepare electrodes. Thereafter, the electrodes are put into a can or a container similar thereto, and a lithium secondary battery is then prepared by injecting an electrolyte. In this case, a lithium metal oxide is used as the positive electrode active material, and lithium metal, a lithium alloy, crystalline or amorphous carbon, or a carbon composite is used as the negative electrode active material.

Charge and discharge of the lithium secondary battery is performed while a process of intercalating and deintercalating lithium ions from a lithium metal oxide positive electrode into and out of a graphite negative electrode is repeated. In this case, since lithium is highly reactive, the lithium reacts with the carbon electrode to form $Li_2CO_3$, LiO, or LiOH, and thus, a film may be formed on the surface of the negative electrode. The film is referred to as "solid electrolyte interface (SEI)", wherein the SEI formed at an initial stage of charging may prevent a reaction of the lithium ions with the carbon negative electrode or other materials during charge and discharge. Also, the SEI only passes the lithium ions by acting as an ion tunnel. That is, the ion tunnel may prevent the collapse of a structure of the carbon negative electrode due to the co-intercalation of the carbon negative electrode and organic solvents of the electrolyte having a high molecular weight which solvates the lithium ions and moves therewith.

Thus, in order to improve high-temperature cycle characteristics and low-temperature output of the lithium secondary battery, a robust SEI must be formed on the negative electrode of the lithium secondary battery.

Since a conventional non-aqueous electrolyte solution comprises an electrolyte additive having poor characteristics, it is disadvantageous in that it is difficult to expect the improvement of low-temperature or high-temperature output characteristics due to the formation of a non-uniform SEI. Furthermore, even in a case in which the electrolyte additive is comprised, since a side reaction due to the electrolyte additive occurs when an amount of the electrolyte additive added may not be adjusted to the required amount, irreversible capacity of the secondary battery may ultimately be increased and output characteristics may be reduced.

Thus, there is a need to develop a compound which may be used as an electrolyte additive for improving overall performance, such as output characteristics, high-temperature storage characteristics, and life characteristics, of the battery by forming a robust SEI on the positive electrode and the negative electrode.

PRIOR ART DOCUMENT

U.S. Patent Publication No. 2017-0077551

DISCLOSURE OF THE INVENTION

Technical Problem

An aspect of the present invention provides a novel electrolyte additive for improving overall performance, such as output, capacity, cycle characteristics, and storage characteristics, of a lithium secondary battery.

Another aspect of the present invention provides a non-aqueous electrolyte solution for a lithium secondary battery which comprises a lithium salt, an organic solvent, and the electrolyte additive.

Another aspect of the present invention provides a lithium secondary battery comprising the non-aqueous electrolyte solution for a lithium secondary battery.

Technical Solution

According to an aspect of the present invention, there is provided an electrolyte additive comprising a compound represented by Formula 1.

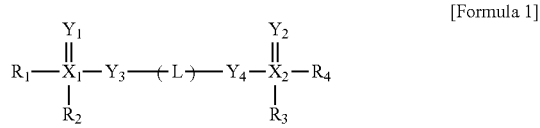

[Formula 1]

In Formula 1, $X_1$ and $X_2$ are phosphorus (P), $Y_1$ to $Y_4$ are each independently oxygen (O) or sulfur (S), L is a direct bond or a divalent hydrocarbon group having 1 to 10 carbon atoms, $R_1$ to $R_4$ are each independently hydrogen, a halogen atom, a nitrile group, or a monovalent hydrocarbon group having 1 to 20 carbon atoms, the divalent hydrocarbon group having 1 to 10 carbon atoms and the monovalent hydrocarbon group having 1 to 20 carbon atoms are substituted or unsubstituted, and the substitution is performed with at least one substituent selected from the group consisting of an alkyl group having 1 to 20 carbon atoms, an alkenyl group having 2 to 20 carbon atoms, an alkynyl group having 2 to 20 carbon atoms, and an aryl group having 6 to 20 carbon atoms.

Specifically, in the compound represented by Formula 1, L may be a substituted or unsubstituted alkylene group having 1 to 10 carbon atoms, and $R_1$ to $R_4$ each independently may be a halogen atom or a substituted or unsubstituted monovalent hydrocarbon group having 1 to 20 carbon atoms.

Specifically, the compound of Formula 1 may be selected from compounds represented by Formula 1a or Formula 1b below.

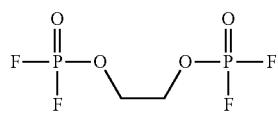

[Formula 1a]

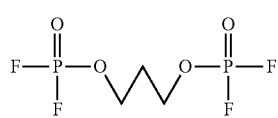

[Formula 1b]

According to another aspect of the present invention, there is provided a non-aqueous electrolyte solution for a lithium secondary battery which comprises a lithium salt, an organic solvent, and a first additive, wherein the first additive is the electrolyte additive of the present invention.

The first additive may be comprised in an amount of about 0.1 wt % to about 6 wt %, for example, 0.5 wt % to 5 wt % based on a total weight of the non-aqueous electrolyte solution.

The non-aqueous electrolyte solution may further comprise a second additive selected from the group consisting of a non-lithiated additive, a lithiated additive, and a mixture thereof.

The non-lithiated additive may comprise at least one selected from the group consisting of a carbonate-based compound, a phosphate-based compound, a borate-based compound, a silane-based compound, a sulfur-containing compound, a nitrile-based compound, and a fluorobenzene-based compound.

The non-lithiated additive may be comprised in an amount of about 0.01 wt % to about 10 wt % based on the total weight of the non-aqueous electrolyte solution.

The lithiated additive may comprise at least one selected from the group consisting of boron halide-based lithium, boron oxalate-based lithium, imidazole-based lithium, phosphate-based lithium, and sulfate-based lithium.

The lithiated additive may be comprised in an amount of about 0.01 wt % to about 10 wt % based on the total weight of the non-aqueous electrolyte solution.

According to another aspect of the present invention, there is provided a lithium secondary battery comprising the non-aqueous electrolyte solution for a lithium secondary battery.

Advantageous Effects

According to the present invention, a non-aqueous electrolyte solution, which comprises a compound capable of maintaining a passive effect by increasing an effect of forming a stable SEI on surfaces of a positive electrode and a negative electrode as an electrolyte additive, may be provided. Also, a lithium secondary battery having improved overall performance, such as cycle capacity characteristics and high-temperature storage characteristics, may be prepared by comprising the same.

MODE FOR CARRYING OUT THE INVENTION

Hereinafter, preferred embodiments of the present invention will be described in more detail. It will be understood that words or terms used in the specification and claims shall not be interpreted as the meaning defined in commonly used dictionaries, and it will be further understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

Accordingly, since configurations illustrated in examples described in the specification are merely the most exemplary embodiments of the present invention and do not represent the entire technical idea of the present invention, it should be understood that there may be various equivalents and modifications capable of replacing them at the time of application.

Also, the terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Furthermore, before describing the present invention, the expressions "a" and "b" in the description of "a to b carbon atoms" in the specification each denote the number of carbon atoms comprised in a specific functional group. That is, the functional group may comprise "a" to "b" carbon atoms. For example, the expression "alkylene group having 1 to 5 carbon atoms" denotes an alkylene group comprising 1 to 5 carbon atoms, that is, —$CH_2$—, —$CH_2CH_2$—, —$CH_2CH_2CH_2$—, —$CH_2(CH_2)CH$—, —$CH(CH_2)CH_2$—, and —$CH(CH_2)CH_2CH_2$—.

Also, unless otherwise defined in the specification, the expression "substituted" denotes that at least one hydrogen bonded to carbon is substituted with an element other than hydrogen, for example, at least one substituent selected from the group consisting of an alkyl group having 1 to 20 carbon atoms, an alkenyl group having 2 to 20 carbon atoms, an alkynyl group having 2 to 20 carbon atoms, and an aryl group having 6 to 20 carbon atoms.

Electrolyte Additive

According to the present specification, a novel electrolyte additive is provided.

The electrolyte additive may comprise a compound represented by Formula 1.

[Formula 1]

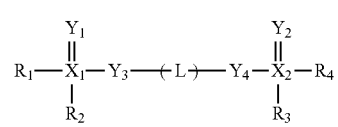

In Formula 1, $X_1$ and $X_2$ are phosphorus (P), $Y_1$ to $Y_4$ are each independently oxygen (O) or sulfur (S), L is a direct bond or a divalent hydrocarbon group having 1 to 10 carbon atoms, $R_1$ to $R_4$ are each independently hydrogen, a halogen atom, a nitrile group, or a monovalent hydrocarbon group having 1 to 20 carbon atoms, the divalent hydrocarbon group having 1 to 10 carbon atoms and the monovalent hydrocarbon group having 1 to 20 carbon atoms are substituted or unsubstituted, and the substitution is performed with at least one substituent selected from the group consisting of an alkyl group having 1 to 20 carbon atoms, an alkenyl group having 2 to 20 carbon atoms, an alkynyl group having 2 to 20 carbon atoms, and an aryl group having 6 to 20 carbon atoms.

Specifically, in Formula 1, L, as a linking group, may be a substituted or unsubstituted alkylene group having 1 to 10 carbon atoms. Also, $R_1$ to $R_4$ in Formula 1 each independently may be a halogen atom or a substituted or unsubstituted monovalent hydrocarbon group having 1 to 20 carbon atoms, preferably a halogen atom, and more preferably fluorine (F).

Also, according to structures of $Y_3$ and $Y_4$, a diether bond or a dithioether bond may be present in Formula 1, and a better oxidation safety improvement effect may be achieved due to these bonds.

Specifically, the compound of Formula 1 as described above may be selected from compounds represented by Formula 1a or Formula 1b below.

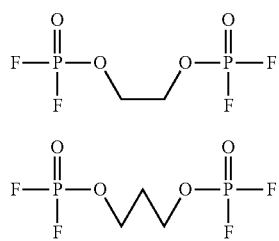

[Formula 1a]

[Formula 1b]

In the present invention, since the compound of Formula 1 comprised as an electrolyte additive may comprise a difluorophosphate structure, it may form a uniform and thin film on a positive electrode and a negative electrode instead of being decomposed on a surface of the positive electrode. That is, the compound of Formula 1 may stabilize the surface of the positive electrode by forming the thin film while oxygen of the difluorophosphate structure is adsorbed on the surface of the positive electrode where oxygen is lost and may prevent exposure to a non-aqueous electrolyte solution. As a result, the compound of Formula 1 may improve durability of a battery by suppressing the generation of $O_2$ from the positive electrode and suppressing a side reaction between the positive electrode and the electrolyte solution. Also, since a robust and stable SEI may be formed on a surface of the negative electrode while the difluorophosphate structure is reduced during the operation of the battery, the durability and high-temperature storage characteristics of the battery may be improved.

Non-Aqueous Electrolyte Solution for Lithium Secondary Battery

In addition, according to an embodiment of the present invention, a non-aqueous electrolyte solution for a lithium secondary battery comprising a lithium salt, an organic solvent, and the electrolyte additive of the present invention, as a first additive, may be provided.

That is, since the compound represented by Formula 1, which is comprised as the first additive, is not decomposed even at high temperatures and is stable, it does not cause a side reaction, for example, decomposition on the surface of the positive electrode or oxidation of the non-aqueous electrolyte solution. Thus, an increase in irreversible capacity of the battery may be prevented, and, accordingly, an effect of increasing reversible capacity may be achieved.

The compound of Formula 1, as the first additive, may be used in an amount of about 0.1 wt % to about 6 wt %, particularly 0.5 wt % to 5 wt %, and more particularly 1 wt % to 5 wt % based on a total weight of the non-aqueous electrolyte solution.

In a case in which the amount of the compound of Formula 1, as the first additive, is in a range of 0.1 wt % to 6 wt %, a robust SEI may be formed on the surfaces of the positive electrode and the negative electrode, and an increase in resistance due to the excessive formation of the film on the surface of the electrode during initial charge may be prevented. In this case, if the amount of the first additive is greater than 6 wt %, since a side reaction occurs due to the excessive amount of the additive, cycle life characteristics and capacity characteristics of the battery may be degraded, and, if the amount of the first additive is less than 0.1 wt %, since an effect of adding the first additive is insignificant, the formation of a stable SEI may be difficult.

As described above, since the compound represented by Formula 1 forms the uniform and thin film on the surfaces of the positive electrode and the negative electrode, but mainly acts on the formation of the positive electrode SEI to reduce a reaction of the positive electrode with other materials, the durability of the battery may be improved. Thus, the non-aqueous electrolyte solution for a lithium secondary battery of the present invention may further comprise a second additive capable of assisting in the formation of the negative electrode film, as an auxiliary agent, in the non-aqueous electrolyte solution in addition to the compound of Formula 1 as the first additive.

A type of the second additive is not particularly limited, but the second additive may specifically comprise a lithiated additive and/or a non-lithiated additive.

As described above, since the compound of Formula 1, as the first additive, and the lithiated additive and/or the non-lithiated additive, as the second additive, are used together in the non-aqueous electrolyte solution for a lithium secondary battery of the present invention, a more stable and robust SEI may be formed on the surfaces of the positive electrode and the negative electrode, and thus, an improvement of overall performance, such as high-temperature storage characteristics and life characteristics, of the lithium secondary battery may be achieved.

Examples of the non-lithiated additive and the lithiated additive, which may be used as the second additive, are as follows.

Non-Lithiated Additive

The non-lithiated additive is a compound which may provide a synergistic effect on the performance improvement of the lithium secondary battery by being used with the compound of Formula 1, wherein, specifically, it may play a complementary role in suppressing the decomposition of the solvent in the non-aqueous electrolyte solution and improving mobility of lithium ions in addition to the effect of the compound of Formula 1.

A relative amount of the non-lithiated additive with respect to the above-described compound represented by Formula 1 is not particularly limited, but, in a case in which the non-lithiated additive is comprised in the non-aqueous electrolyte solution, the non-lithiated additive may be used in an amount of about 0.01 wt % to about 10 wt %, particularly 0.05 wt % to 10 wt %, and more particularly 0.1 wt % to 8 wt %, for example, 0.1 wt % to 5 wt % based on the total weight of the non-aqueous electrolyte solution. In a case in which the amount of the non-lithiated additive is less than 0.01 wt %, a non-lithiated additive addition effect is insignificant, and, in a case in which the amount of the non-lithiated additive is greater than 10 wt %, since a side reaction may be caused by the excessive amount of the additive, interfacial resistance of the SEI may be increased and overall performance, such as capacity characteristics, may be reduced.

Specifically, the non-lithiated additive may be at least one selected from the group consisting of a carbonate-based compound, a phosphate-based compound, a borate-based compound, a silane-based compound, a sulfur-containing compound, a nitrile-based compound, and a fluorobenzene-based compound.

Hereinafter, specific compounds usable as the non-lithiated additive are disclosed, but the non-lithiated additive is not limited to these compounds and, in addition, a compound, such as a carbonate-based compound or a borate-based compound, which has typical features while being able to compensate for the performance improvement effect of the compound represented by Formula 1, may be used.

First, as typical examples of the carbonate-based compound, vinylene carbonate, fluoroethylene carbonate (FEC), difluoroethylene carbonate, or vinyl ethylene carbonate may be used, and the compound may be substituted with a substituent such as an alkyl group having 1 to 3 carbon atoms.

Since the carbonate compound may mainly form a SEI on the surface of the negative electrode during battery activation, a stable SEI may be formed even at high temperatures by using the carbonate compound together with the compound represented by Formula 1 which forms a SEI on the negative electrode, and thus, the durability of the battery may be improved.

Also, the phosphate-based compound, for example, may be represented by Formula 2 below.

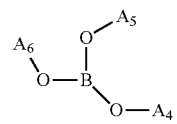

[Formula 2]

In Formula 2, $A_1$ to $A_3$ are each independently —Si($R_a$)$_n$($R_b$)$_{3-n}$, or a propynyl group (—C≡C), wherein $R_a$ and $R_b$ are each independently an alkyl group having 1 to 4 carbon atoms, and n is an integer of 0 to 3.

As the phosphate-based compound, for example, tris(trimethylsilyl) phosphate, tris(triethylsilyl) phosphate, tris(tripropylsilyl) phosphate, bis(trimethylsilyl)(triethylsilyl) phosphate, bis(triethylsilyl)(trimethylsilyl) phosphate, bis(tripropylsilyl)(trimethylsilyl) phosphate, or bis(tridimethylsilyl)(tripropylsilyl) phosphate may be used, and a compound, in which alkyl groups of each silyl group are different from each other, may also be used.

Furthermore, dipropynyl ethyl phosphate or diethyl propynyl phosphate may also be used as the phosphate-based compound.

Since the phosphate-based compound stabilizes $PF_6$ anions in the electrolyte solution and assists in the formation of films on the positive electrode and negative electrode, the phosphate-based compound may improve the durability of the battery by being used together with the compound represented by Formula 1.

Also, the borate-based compound may be represented by Formula 3 below.

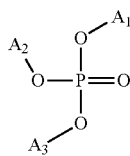

[Formula 3]

In Formula 3, $A_4$ to $A_6$ are each independently —Si($R_c$)$_m$($R_d$)$_{3-m}$, or a propynyl group (—C≡C), wherein $R_c$ and $R_d$ are each independently an alkyl group having 1 to 4 carbon atoms, and m is an integer of 0 to 3.

With respect to the borate-based compound, a silyl group or a propynyl group may be bonded as in the above-described phosphate-based compound, and the substituent exemplified in the phosphate-based compound may be equally used in the silyl group and the propynyl group.

Since the borate-based compound promotes ion-pair separation of a lithium salt, the borate-based compound may improve the mobility of lithium ions, may reduce the interfacial resistance of the SEI, and may dissociate a material, such as LiF, which may be formed during a battery reaction but is not well separated, and thus, a problem, such as generation of hydrofluoric acid gas, may be solved.

Furthermore, trialkylvinyl silane, dialkyldivinyl silane, alkyltrivinyl silane, or tert-vinyl silane, in which the alkyl has a carbon number of 1 to 4, may be used as the silane-based compound.

Since the silane-based compound may form a silicon (Si)-based SEI on the negative electrode by being used together with the compound represented by Formula 1, the silane-based compound may improve durability of the negative electrode of the battery.

Also, the sulfur-containing compound may be represented by Formula 4 below.

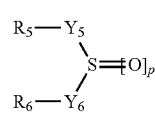

[Formula 4]

In Formula 4, $Y_5$ and $Y_6$ are each independently a direct bond, carbon (C), or O, $R_5$ and $R_6$ are each independently a substituted or unsubstituted alkyl group having 1 to 10 carbon atoms, a substituted or unsubstituted aryl group having 6 to 20 carbon atoms, or are linked together to form 4- to 7-membered rings, and p is 1 or 2.

In Formula 4, if p is 1, the number of S=O bonds is 1, $R_5$ and $R_6$ are linked together to form a ring, and simultaneously, when $Y_5$ and $Y_6$ are O, the compound may be a sulfite-based sulfur-containing compound. If p is 2, the number of S=O bonds is 2, $R_5$ and $R_6$ are linked together to form a ring, and simultaneously, when $Y_5$ and $Y_6$ are O, the compound may be a sulfate-based sulfur-containing compound, and, in the sulfate-based compounds, when any one of $Y_5$ and $Y_6$ is C, the compound may be a sultone-based sulfur-containing compound. Also, if p is 2, the number of S=O bonds is 2 and, when $R_5$ and $R_6$ do not form a ring, the compound may be a sulfone-based compound.

As a specific example, methylene sulfate, ethylene sulfate, trimethylene sulfate, tetramethylene sulfate, or sulfate having a substituent bonded to these alkylene groups may be used as the sulfate-based sulfur-containing compound, and methylene sulfite, ethylene sulfite, trimethylene sulfite, tetramethylene sulfite, or sulfite having a substituent bonded to these alkylene groups may be used as the sulfite-based sulfur-containing compound.

Also, as the sulfone-based sulfur-containing compound, dialkyl sulfone to which an alkyl group having 1 to 5 carbon atoms is bonded, diaryl sulfone to which an aryl group having 6 to 12 carbon atoms is bonded, or sulfone having a substituent bonded to the alkyl or aryl may be used, and, as the sultone-based sulfur-containing compound, 1,3-propane sultone, 1,3-propene sultone, 1,4-butane sultone, 1,5-pentane sultone, or sultone having a substituent bonded to these alkylene groups may be used.

The sulfur-containing compounds may generally play a role in complementing the formation of the SEI on the surface of the negative electrode, and the sulfur-containing compounds may have an effect on high-temperature storage performance and cycle life characteristics by contributing to the formation of stable SEI similar to the above-described compound represented by Formula 1.

Furthermore, the nitrile-based compound is a compound represented by Formula 5 below.

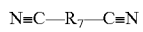 [Formula 5]

In Formula 5, $R_7$ is an alkylene group having 1 to 5 carbon atoms.

The nitrile-based compound is a compound containing two nitrile groups, wherein a linking group linking the two nitrile groups is an alkylene group and a carbon number may be in a range of 1 to 5, for example, 2 to 4.

The nitrile-based compound, in which the carbon number of the alkylene group, as a linking group, is in a range of 2 to 4, comprises succinonitrile, glutaronitrile, or adiponitrile, and at least one of these compounds may be comprised as one component of the electrolyte additive composition. Among them, succinonitrile or adiponitrile may be preferably used.

The nitrile-based compound is a compound capable of providing a synergistic effect on the improvement in performance of the lithium secondary battery by being used together with the above-described compound of Formula 1, wherein the nitrile-based compound may have an effect such as suppression of the dissolution of positive electrode transition metals.

In a case in which the nitrile-based compound is used together with the above-described compound of Formula 1, an effect, such as improvement of high-temperature characteristics, may be achieved due to the stabilization of the positive electrode/negative electrode films. That is, the nitrile-based compound may play a complementary role in forming the negative electrode SEI in addition to the effect induced by the compound of Formula 1, may play a role in suppressing the decomposition of the solvent in the electrolyte, and may play a role in improving the mobility of lithium ions.

Also, the fluorobenzene-based compound may be a benzene compound, which is substituted with fluorine instead of hydrogen, such as fluorobenzene, difluorobenzene, and trifluorobenzene.

As described above, since the stable and robust SEI may be formed on the surfaces of the positive electrode and the negative electrode when the compound represented by Formula 1 and the non-lithiated additive are comprised as an electrolyte additive composition, a side reaction, for example, the decomposition of the solvent in the non-aqueous electrolyte around the electrode, may be suppressed. Accordingly, an amount of gas generated may be significantly reduced even if the battery is stored for a long period of time in a high-temperature environment, and an effect of increasing reversible capacity and improving life characteristics may be obtained due to the improvement in storage characteristics.

Lithiated Additive

The lithiated additive is a compound capable of providing a synergistic effect with the compound of Formula 1 on the improvement in performance of the lithium secondary battery, wherein, specifically, the lithiated additive may play a complementary role in forming the SEI on the surface of the negative electrode in addition to the effect induced by the compound of Formula 1, suppressing the decomposition of the solvent in the electrolyte, and improving the mobility of lithium ions.

A relative amount of the lithiated additive with respect to the above-described compound represented by Formula 1 is not particularly limited, but, in a case in which the lithiated additive is comprised in the non-aqueous electrolyte solution, the lithiated additive may be used in an amount of about 0.01 wt % to about 10 wt %, preferably 0.05 wt % to 10 wt %, and more preferably 0.1 wt % to 8 wt %, for example, 0.1 wt % to 5 wt % based on the total weight of the non-aqueous electrolyte solution. In a case in which the amount of the lithiated additive is less than 0.01 wt %, a lithiated additive addition effect is insignificant, and, in a case in which the amount of the lithiated additive is greater than 10 wt %, since a side reaction may be caused by the excessive amount of the additive, interfacial resistance of the SEI on the surface of the negative electrode may be increased and overall performance, such as capacity characteristics, may be reduced.

As typical examples of the lithiated additive, boron halide-based lithium, boron oxalate-based lithium, imidazole-based lithium, phosphate-based lithium, or sulfate-based lithium may be used, and a mixture of at least one selected therefrom may be used.

Hereinafter, specific compounds usable as the lithiated additive are disclosed, but the lithiated additive is not limited to these compounds and any compound, such as a boron halide-based compound, a boron oxalate-based compound, or a phosphate-based compound, which has typical features while being able to compensate for the performance improvement effect of the compound represented by Formula 1, may be used.

Specifically, lithium tetrafluoro borate, lithium tetrachloro borate, lithium chlorotrifluoro borate, lithium trichlorofluoro borate, or lithium dichlorodifluoro borate, for example, may be used as the boron halide-based lithium.

Lithium bis(oxalato)borate, lithium difluoro(oxalato)borate, or lithium dichloro(oxalato)borate may be used as the boron oxalate-based lithium.

The imidazole-based lithium may comprise lithium 4,5-dicyano-2-(($halo)_o(alkyl)_q$)imidazole, and in the compound name, the expression "halo", as a halogen substituent, may be each independently fluorine (F) or chlorine (Cl), the expression "alkyl", as an alkyl substituent, may be each independently an alkyl group having 1 to 3 carbon atoms, and o and q may be an integer of 1 to 3 and may satisfy o+q=4.

For example, lithium dihalo phosphate, lithium dialkyl phosphate, lithium dihalo(bisoxalato) phosphate, and lithium dialkyl(bisoxalato) phosphate may be used as the phosphate-based lithium. In the names of the above compounds, the expression "dihalo", as two halogen substituents, may be each independently F or Cl, and the expression "dialkyl", as two alkyl substituents, may be each independently an alkyl group having 1 to 3 carbon atoms.

The sulfate-based lithium may comprise lithium alkyl sulfate, and in the compound name, the expression "alkyl", as an alkyl substituent, may be an alkyl group having 1 to 3 carbon atoms.

Specifically, in the non-aqueous electrolyte solution for a lithium secondary battery of the present invention, at least one second additive from the non-lithiated additive and/or the lithiated additive may be selectively comprised together with the first additive as the compound represented by Formula 1, and, as described above, each of the first and second additives may be preferably comprised in an amount of 0.01 wt % to 10 wt % based on the total weight of the non-aqueous electrolyte solution.

However, there is a need to adjust a total weight of the first additive and the second additive to be in a range of less than 20 wt %, particularly about 0.1 wt % to about 20 wt %, and more particularly 0.1 wt % to 16 wt % based on the total weight of the non-aqueous electrolyte solution. In this case, a weight ratio of the non-lithiated additive:the lithiated additive may be in a range of 0:100 to 100:0, and the mixing ratio may be appropriately adjusted according to an SEI formation improvement effect, low-temperature high-rate discharge characteristics, high-temperature stability, overcharge prevention, or a high-temperature swelling improvement effect.

Lithium Salt

In the non-aqueous electrolyte solution according to the present specification, any lithium salt typically used in an electrolyte solution for a lithium secondary battery may be used as the lithium salt without limitation, and, for example, the lithium salt may comprise $Li^+$ as a cation, and may comprise at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may comprise a single material selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, $LiCF_3SO_3$, $LiCH_3CO_2$, $LiCF_3CO_2$, $LiN(SO_2CF_3)_2$ (lithium (bis)trifluoromethanesulfonimide, LiTFSI), $LiN(SO_2F)_2$ (lithium fluorosulfonyl imide, LiFSI), $LiCH_3SO_3$, and $LiN(SO_2CF_2CF_3)_2$ (lithium bisperfluoroethanesulfonimide, LiBETI), or a mixture of two or more thereof.

Specifically, the electrolyte salt may comprise a single material selected from the group consisting of $LiPF_6$, $LiBF_4$, $LiCH_3CO_2$, $LiCF_3CO_2$, $LiCH_3SO_3$, LiFSI, LiTFSI, and LiBETI, or a mixture of two or more thereof.

The lithium salt may be appropriately changed in a normally usable range but may be comprised in a concentration of 0.8 M to 1.5 M in the electrolyte solution to obtain an optimum effect of forming a film for preventing corrosion of the surface of the electrode. In a case in which the concentration of the electrolyte salt is greater than 1.5 M, since the concentration of the non-aqueous electrolyte solution is increased, wettability may be degraded or the effect of forming the film may be reduced.

Organic Solvent

Also, the organic solvent is not limited as long as it may minimize decomposition due to an oxidation reaction during charge and discharge of the battery and may exhibit desired characteristics with the additive. For example, an ether-based solvent, an ester-based organic solvent, or an amide-based organic solvent may be used alone or in a mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based organic solvent may comprise at least one compound selected from the group consisting of a cyclic carbonate-based organic solvent, a linear carbonate-based organic solvent, a linear ester-based organic solvent, and a cyclic ester-based organic solvent.

Among these compounds, specific examples of the cyclic carbonate-based organic solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Also, specific examples of the linear carbonate-based organic solvent may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Specific examples of the linear ester-based organic solvent may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester-based organic solvent may be any one selected from the group consisting of γ-butyrolactone, γ-valerolactone, γ-caprolactone, σ-valerolactone, and ε-caprolactone, or a mixture of two or more thereof, but the present invention is not limited thereto.

Among the ester-based organic solvents, since the cyclic carbonate-based compound well dissociates the lithium salt in the electrolyte due to high permittivity as a highly viscous organic solvent, the cyclic carbonate-based compound may be preferably used. Since an electrolyte solution having high electrical conductivity may be prepared when the above cyclic carbonate-based compound is mixed with the low viscosity, low permittivity linear carbonate-based compound, such as dimethyl carbonate and diethyl carbonate, and the linear ester-based compound in an appropriate ratio, the cyclic carbonate-based compound may be more preferably used.

In addition, a mixed organic solvent, in which 3 kinds of carbonate-based solvents are mixed, may be used as the organic solvent, and, it is more desirable to use a ternary non-aqueous organic solvent. Examples of the compound, which may be used in the mixed organic solvent, may be ethylene carbonate, propylene carbonate, butylene carbonate, dimethyl carbonate, diethyl carbonate, dipropyl carbonate, ethylmethyl carbonate, vinylene carbonate, fluoroethylene carbonate, methylpropyl carbonate, or ethylpropyl carbonate, and a mixed solvent, in which 3 kinds selected from the above carbonate-based compounds are mixed, may be used.

Lithium Secondary Battery

According to the present specification, a lithium secondary battery comprising the above-described electrolyte for a lithium secondary battery may be provided, and the lithium secondary battery comprises a positive electrode comprising a positive electrode active material, a negative electrode comprising a negative electrode active material, a separator disposed between the positive electrode and the negative electrode, and the above-described electrolyte.

The lithium secondary battery of the present invention may be prepared according to a typical method known in the art. For example, the lithium secondary battery may be prepared by disposing a porous separator between the positive electrode and the negative electrode and injecting an electrolyte in which a lithium salt is dissolved.

The positive electrode may be prepared by forming a positive electrode material mixture layer on a positive electrode collector. The positive electrode material mixture layer may be prepared by coating the positive electrode collector with a positive electrode slurry comprising a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically comprise a lithium composite metal oxide comprising lithium and at least one metal such as cobalt, manganese, nickel, or aluminum. Specifically, the lithium composite metal oxide may comprise lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be comprised.

Among these materials, in terms of the improvement of capacity characteristics and stability of the battery, the lithium composite metal oxide may comprise $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be comprised in an amount of 80 wt % to 99.5 wt %, for example, 85 wt % to 95 wt % based on a total weight of solid content in the positive electrode slurry.

In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. If the amount of the binder is less than 1 wt %, adhesion between the electrode active material and the current collector may be insufficient, and, if the amount of the binder is greater than 30 wt %, the adhesion may be improved, but, since the amount of the electrode active material is reduced accordingly, battery capacity may be reduced.

Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Also, the conductive agent may be added in an amount of 1 wt % to 20 wt % based on the total weight of the solid content in the positive electrode slurry.

Any conductive agent may be used as the conductive agent without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 0.5 wt % to 50 wt %, particularly 1 wt % to 15 wt %, and more particularly 3 wt % to 10 wt % based on the total weight of the solid content in the positive electrode slurry. If the amount of the conductive agent is excessively small at less than 0.5 wt %, an effect of improving electric conductivity may not be expected or electrochemical characteristics of the battery may be degraded, and, if the amount of the conductive agent is excessively large at greater than 50 wt %, since the amount of the positive electrode active material may be relatively reduced, the capacity and energy density may be reduced.

Those sold under the names, such as acetylene black (Chevron Chemical Company, Denka Singapore Private Limited, or Gulf Oil Company), Ketjen black, ethylene carbonate (EC) (Armak Company), Vulcan XC-72 (Cabot Company), and Super P, as furnace black, (Timcal Graphite & Carbon), may be used as the conductive agent.

In the positive electrode, a filler may be further added to the mixture, if necessary. The filler, as a component that suppresses the expansion of the positive electrode, is selectively used, wherein the filler is not particularly limited as long as it is fibrous material while not causing chemical changes in the battery, and, for example, an olefin-based polymer such as polyethylene and polypropylene; and a fibrous material, such as glass fibers and carbon fibers, are used.

The solvent used for forming the positive electrode may comprise an organic solvent, such as N-methylpyrrolidone (NMP), dimethylformamide (DMF), acetone, and dimethylacetamide, or water, and these solvents may be used alone or in a mixture of two or more thereof.

The solvent may be used in an amount such that the solvent has a viscosity that may dissolve and disperse the electrode active material, the binder, and the conductive agent in consideration of a coating thickness of the slurry and manufacturing yield. For example, the solvent may be comprised in an amount such that a concentration of the solid content in the slurry comprising the positive electrode active material as well as selectively the binder and the conductive agent is in a range of 10 wt % to 60 wt %, for example, 20 wt % to 50 wt %.

The negative electrode may be prepared by a typical method known in the art. For example, the negative electrode may be prepared by forming a negative electrode material mixture layer on a negative electrode collector. The negative electrode material mixture layer may be formed by coating the negative electrode collector with a negative electrode slurry comprising a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may comprise at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may comprise Si, $SiO_x$ ($0 < x < 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), S, selenium (Se), tellurium (Te), polonium (Po), and a combination thereof.

The transition metal oxide may comprise lithium-containing titanium composite oxide (LTO), vanadium oxide, and lithium vanadium oxide.

The negative electrode active material may be comprised in an amount of 80 wt % to 99 wt % based on a total weight of solid content in the negative electrode slurry.

Those used in the positive electrode may be equally used as the binder and the conductive agent comprised in the negative electrode.

Also, the solvent may comprise water or an organic solvent, such as NMP and alcohol, and may be used in an amount such that desirable viscosity is obtained when the negative electrode active material as well as selectively the binder and the conductive agent are comprised. For example, the solvent may be comprised in an amount such that a concentration of the solid content in the negative electrode slurry comprising the negative electrode active material as well as selectively the binder and the conductive agent is in a range of 50 wt % to 75 wt %, for example, 50 wt % to 65 wt %.

Both of a polyolefin-based polymer typically used in the art and a composite separator having an organic-inorganic composite layer formed on an olefin-based substrate may be used as the separator disposed between the positive electrode and the negative electrode and insulating these electrodes, but the separator is not particularly limited thereto.

For example, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 µm to 50 µm and a porosity of 5% to 95%. Also, the porous separator may generally have a thickness of 5 µm to 300 µm.

The positive electrode, negative electrode, and separator, which have the above-described structure, are accommodated in a pouch case, and a pouch type battery may then be prepared by injecting the non-aqueous electrolyte, but the present invention is not limited thereto. A shape of the lithium secondary battery according to the present specification is not particularly limited, but a cylindrical type using a can or a prismatic type may be used, and a coin type may be used.

EXAMPLES

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

Example 1

(Non-Aqueous Electrolyte Solution Preparation)

A non-aqueous electrolyte solution of the present invention was prepared by adding 0.1 g of the compound represented by Formula 1a to 99.9 g of a non-aqueous organic solvent (ethylene carbonate (EC):ethyl methyl carbonate (EMC)=30:70 vol %) in which 1 M $LiPF_6$ was dissolved.

(Positive Electrode Preparation)

40 g of a slurry, in which lithium cobalt composite oxide ($LiCoO_2$) as positive electrode active material particles, carbon black as a conductive agent, and polyvinylidene fluoride (PVDF), as a binder, were mixed in a ratio of 90:5:5 (wt %), was mixed with 100 g of N-methyl-2-pyrrolidone (NMP) to prepare a positive electrode active material slurry. An about 100 µm thick positive electrode collector (Al thin film) was coated with the positive electrode active material slurry, dried, and roll-pressed to prepare a positive electrode.

(Negative Electrode Preparation)

80 g of a slurry, in which natural graphite as a negative electrode active material, PVDF as a binder, and carbon black, as a conductive agent, were mixed in a ratio of 95:2:3 (wt %), was mixed with 100 g of N-methyl-2-pyrrolidone (NMP) to prepare a negative electrode active material slurry. A 90 µm thick negative electrode collector (Cu thin film) was coated with the negative electrode active material slurry, dried, and roll-pressed to prepare a negative electrode.

(Secondary Battery Preparation)

A coin-type battery was prepared by a typical method in which the above-prepared positive electrode and negative electrode were stacked with a polyethylene porous film, and a lithium secondary battery was then prepared by injecting the prepared non-aqueous electrolyte solution thereinto.

Example 2

A non-aqueous electrolyte solution and a lithium secondary battery comprising the same were prepared in the same manner as in Example 1 except that 0.1 g of the compound of Formula 1a, as a first additive, and 1 g of a second additive (FEC) were added to 98.9 g of an organic solvent during the preparation of the non-aqueous electrolyte solution (see Table 1).

Example 3

A non-aqueous electrolyte solution and a lithium secondary battery comprising the same were prepared in the same manner as in Example 1 except that 2 g of the compound of Formula 1a, as a first additive, was added to 98 g of an organic solvent during the preparation of the non-aqueous electrolyte solution (see Table 1).

Example 4

A non-aqueous electrolyte solution and a lithium secondary battery comprising the same were prepared in the same manner as in Example 1 except that 5 g of the compound of Formula 1a, as a first additive, was added to 95 g of an organic solvent during the preparation of the non-aqueous electrolyte solution (see Table 1).

Example 5

A non-aqueous electrolyte solution and a lithium secondary battery comprising the same were prepared in the same manner as in Example 1 except that 6 g of the compound of Formula 1a, as a first additive, was added to 94 g of an organic solvent during the preparation of the non-aqueous electrolyte solution (see Table 1).

Example 6

A non-aqueous electrolyte solution and a lithium secondary battery comprising the same were prepared in the same manner as in Example 1 except that 7 g of the compound of Formula 1a, as a first additive, was added to 93 g of an organic solvent during the preparation of the non-aqueous electrolyte solution (see Table 1).

Comparative Example 1

A non-aqueous electrolyte solution and a lithium secondary battery comprising the same were prepared in the same manner as in Example 1 except that an additive was not added during the preparation of the non-aqueous electrolyte solution (see Table 1).

Comparative Example 2

A non-aqueous electrolyte solution and a lithium secondary battery comprising the same were prepared in the same manner as in Comparative Example 1 except that 1 g of fluoroethylene carbonate, as a second additive, was added to 99 g of an organic solvent during the preparation of the non-aqueous electrolyte solution (see Table 1).

EXPERIMENTAL EXAMPLES

Experimental Example 1. Evaluation of Capacity Retention After Cycle at High Temperature The lithium secondary batteries prepared in Examples 1 to 6 and the lithium secondary batteries prepared in Comparative Examples 1 and 2 were charged at 1.0 C/4.45 V to 4.45 V/112 mA under a constant current/constant voltage (CC/CV) condition at 45° C. and discharged at 1.0 C to a voltage of 3.0 V. This charge and discharge cycle was repeated 200 times and a capacity retention was then calculated using Equation 1 below. The results thereof are presented in the following Table 1.

$$\text{Capacity retention (\%)} = [(\text{discharge capacity after 200 cycles (mAh)})/(\text{discharge capacity after 1 cycle (mAh)})] \times 100 \quad \text{[Equation 1]}$$

Experimental Example 2. Evaluation of Capacity Retention After High Temperature Storage The lithium secondary batteries prepared in Examples 1 to 6 and the lithium secondary batteries prepared in Comparative Examples 1 and 2 were charged at 0.2 C/4.45 V to 4.45 V/112 mA under a constant current/constant voltage (CC/CV) condition at room temperature and discharged at 0.2 C to a voltage of 3.0 V to measure initial discharge capacity.

Thereafter, the secondary batteries were charged at 0.2 C/4.45 V to 4.45 V/112 mA under a constant current/constant voltage (CC/CV) condition at room temperature and then stored at 60° C. for 4 weeks. Next, the secondary batteries were charged at 0.2 C/4.45 V to 4.45 V/112 mA under a constant current/constant voltage (CC/CV) condition at room temperature and discharged at 0.2 C to a voltage of 3.0 V to measure discharge capacity after storage, and a capacity retention was calculated using Equation 2 below. The results thereof are presented in the following Table 1.

$$\text{Capacity retention (\%)} = [\text{discharge capacity after 4 weeks storage (mAh)}]/\text{initial discharge capacity (mAh)}] \times 100 \quad \text{[Equation 2]}$$

Experimental Example 3. Evaluation of Thickness Increase Rate After High Temperature Storage After the initial charge and discharge in Experimental Example 2, each battery was set to a state of charge (SOC) of 50% to measure a thickness, and the thickness was defined as an initial thickness. Subsequently, a battery thickness, which was measured after each battery was stored at 60° C. for 4 weeks, was defined as a final thickness. A thickness increase rate (%) of the battery was calculated using the following Equation 3, and the results thereof are presented in the following Table 1.

$$\text{Thickness increase rate (\%)} = [(\text{final thickness} - \text{initial thickness})/\text{initial thickness}] \times 100 \quad \text{[Equation 3]}$$

Experimental Example 4. Evaluation of Resistance Increase Rate After High Temperature Storage After the initial charge and discharge in Experimental Example 2, capacity was checked at room temperature, each battery was then charged to a SOC of 50% based on discharge capacity and discharged at a current of 3 C for 10 seconds to measure resistance by a voltage drop difference, and the resistance was defined as initial resistance.

After storage at 60° C. for 4 weeks, resistance was measured in the same manner, the resistance was defined as final resistance, and a resistance increase rate (%) was calculated using Equation 4 below. The results thereof are presented in the following Table 1.

$$\text{Resistance increase rate (\%)} = [(\text{discharge resistance after 4 weeks} - \text{initial discharge resistance})/(\text{initial discharge resistance})] \times 100 \quad \text{[Equation 4]}$$

TABLE 1

| | Amount of organic solvent added (g) | First additive | | Second additive | | Capacity retention after 200 cycles at 45° C. (%) | After high temperature storage (60° C., 4 weeks) | | |
|---|---|---|---|---|---|---|---|---|---|
| | | Formula | Amount added (g) | Type | Amount added (g) | | Capacity retention (%) | Resistance increase rate (%) | Thickness increase rate (%) |
| Example 1 | 99.9 | 1a | 0.1 | — | — | 81.6 | 82.3 | 26.3 | 18.4 |
| Example 2 | 98.9 | 1a | 0.1 | FEC | 1 | 83.5 | 84.7 | 25.7 | 20.6 |
| Example 3 | 98 | 1a | 2 | — | — | 89.7 | 90.4 | 19.5 | 15.9 |
| Example 4 | 95 | 1a | 5 | — | — | 87.2 | 88.1 | 22.9 | 13.5 |
| Example 5 | 94 | 1a | 6 | — | — | 84.9 | 86.4 | 23.3 | 12.7 |
| Example 6 | 93 | 1a | 7 | — | — | 80.4 | 81.2 | 26.1 | 12.4 |
| Comparative Example 1 | 100 | — | — | — | — | 71.8 | 73.8 | 34.2 | 28.1 |
| Comparative Example 2 | 99 | — | — | FEC | 1 | 80.2 | 72.5 | 36.8 | 34.2 |

FEC: non-lithiated additive (fluoroethylene carbonate)

As illustrated in Table 1, when capacity retentions after 200 cycles at 45° C. were examined, the capacity retentions of the secondary batteries comprising the non-aqueous electrolyte solutions prepared in Examples 1 to 5 were about 81.6% or more, wherein it may be understood that the capacity retentions were improved in comparison to those of the secondary batteries prepared in Comparative Examples 1 and 2 which comprised the non-aqueous electrolyte solutions that did not contain the first additive.

With respect to the lithium secondary battery prepared in Example 6, since a side reaction was caused by the first additive which was excessively added, the capacity retention was 80.4%, wherein it may be understood that the capacity retention was deteriorated in comparison to those of the lithium secondary batteries prepared in Examples 1 to 5.

Also, as illustrated in Table 1, the secondary batteries comprising the non-aqueous electrolyte solutions prepared in Examples 1 to 5 had a capacity retention after high temperature storage at 60° C. of about 82.3% or more, but it may be understood that the capacity retentions after high temperature storage at 60° C. of the secondary batteries comprising the non-aqueous electrolyte solutions prepared in Comparative Examples 1 and 2 were reduced to about 72.5% or less.

With respect to the lithium secondary battery prepared in Example 6, since a side reaction was caused by the first additive which was excessively added, the capacity retention after high temperature storage was about 81.2%, wherein it may be understood that the capacity retention was deteriorated in comparison to those of the lithium secondary batteries prepared in Examples 1 to 5.

Furthermore, as illustrated in Table 1, when resistance increase rates and battery thickness increase rates after 4 weeks storage at 60° C. of the secondary batteries comprising the non-aqueous electrolyte solutions prepared in Examples 1 to 5 were examined, the resistance increase rates were about 26.3% or less and the thickness increase rates were about 20.6% or less, but, with respect to the secondary batteries comprising the non-aqueous electrolyte solutions prepared in Comparative Examples 1 and 2, it may be understood that the resistance increase rates were degraded to about 34.2% or more and the thickness increase rates were degraded to about 28.1% or more.

With respect to the lithium secondary battery prepared in Example 6, due to the first additive which was excessively added, the resistance increase rate was 26.1% which was at an equivalent level to those of the lithium secondary batteries prepared in Examples 1 to 5, but it may be understood that the thickness increase rate was about 12.4% which was slightly improved in comparison to the lithium secondary batteries prepared in Examples 1 to 5.

From these results, with respect to the secondary batteries of Comparative Examples 1 and 2 in which stability of the SEI formed on the surfaces of the positive electrode and the negative electrode was relatively lower than that of the secondary batteries of Examples 1 to 5 comprising the electrolyte additive of the present invention, it may be understood that both of cycle capacity characteristics and high-temperature storage characteristics were degraded.

The above descriptions are merely exemplary embodiments for preparing a secondary battery according to the present invention, so that the present invention is not limited thereto. The true scope of the present invention should be defined to the extent that those skilled in the art can make various modifications and changes thereto without departing from the scope of the invention, as defined by the appended claims.

The invention claimed is:

1. An electrolyte additive comprising a compound represented by Formula 1:

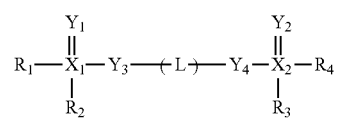

[Formula 1]

wherein, in Formula 1, $X_1$ and $X_2$ are phosphorus (P), $Y_1$ to $Y_4$ are each independently oxygen (O) or sulfur (S), L is a direct bond or a divalent hydrocarbon group having 1 to 10 carbon atoms, and $R_1$ to $R_4$ are each independently hydrogen, a halogen atom, a nitrile group, or a monovalent hydrocarbon group having 1 to 20 carbon atoms, and at least one of $R_1$ to $R_4$ is a halogen atom, wherein the divalent hydrocarbon group having 1 to 10 carbon atoms and the monovalent hydrocarbon group having 1 to 20 carbon atoms are substituted or unsubstituted, and the substitution is performed with at least one substituent selected from the group consisting of an alkyl group having 1 to 20 carbon atoms, an alkenyl group having 2 to 20 carbon atoms, an alkynyl group having 2 to 20 carbon atoms, and an aryl group having 6 to 20 carbon atoms.

2. The electrolyte additive of claim 1, wherein, in the compound represented by Formula 1, L is a substituted or unsubstituted alkylene group having 1 to 10 carbon atoms, and $R_1$ to $R_4$ are each independently a halogen atom or a substituted or unsubstituted monovalent hydrocarbon group having 1 to 20 carbon atoms.

3. The electrolyte additive of claim 1, wherein the compound represented by Formula 1 is selected from compounds represented by Formula 1a or Formula 1b:

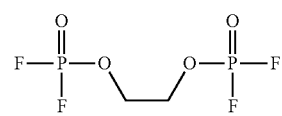

[Formula 1a]

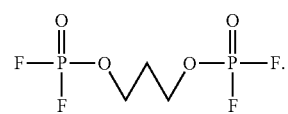

[Formula 1b]

4. A non-aqueous electrolyte solution for a lithium secondary battery, the non-aqueous electrolyte solution comprising:

a lithium salt, an organic solvent, and a first additive, wherein the first additive is the electrolyte additive of claim 1.

5. The non-aqueous electrolyte solution for a lithium secondary battery of claim 4, wherein the first additive is comprised in an amount of 0.1 wt % to 6 wt % based on a total weight of the non-aqueous electrolyte solution.

6. The non-aqueous electrolyte solution for a lithium secondary battery of claim 5, wherein the first additive is comprised in an amount of 0.5 wt % to 5 wt % based on the total weight of the non-aqueous electrolyte solution.

7. The non-aqueous electrolyte solution for a lithium secondary battery of claim 4, further comprising a second additive selected from the group consisting of a non-lithiated additive, a lithiated additive, and a mixture thereof.

8. The non-aqueous electrolyte solution for a lithium secondary battery of claim 7, wherein the non-lithiated additive comprises at least one selected from the group consisting of a carbonate-based compound, a phosphate-based compound, a borate-based compound, a silane-based compound, a sulfur-containing compound, a nitrile-based compound, and a fluorobenzene-based compound.

9. The non-aqueous electrolyte solution for a lithium secondary battery of claim 7, wherein the non-lithiated additive is comprised in an amount of 0.01 wt % to 10 wt % based on a total weight of the non-aqueous electrolyte solution.

10. The non-aqueous electrolyte solution for a lithium secondary battery of claim 7, wherein the lithiated additive comprises at least one selected from the group consisting of boron halide-based lithium, boron oxalate-based lithium, imidazole-based lithium, phosphate-based lithium, and sulfate-based lithium.

11. The non-aqueous electrolyte solution for a lithium secondary battery of claim 7, wherein the lithiated additive is comprised in an amount of 0.01 wt % to 10 wt % based on a total weight of the non-aqueous electrolyte solution.

12. A lithium secondary battery comprising the non-aqueous electrolyte solution for a lithium secondary battery of claim 4.

13. The electrolyte additive of claim 1, wherein, in the compound represented by Formula 1, $Y_1$ to $Y_4$ are each independently oxygen (O), L is a substituted or unsubstituted alkylene group having 1 to 10 carbon atoms, and $R_1$ to $R_4$ are each independently a halogen atom.

14. The non-aqueous electrolyte solution for a lithium secondary battery of claim 7, wherein the non-lithiated additive comprises at least one carbonate-based compound selected from the group consisting of vinylene carbonate, fluoroethylene carbonate, difluoroethylene carbonate, and vinyl ethylene carbonate, which are unsubstituted or substituted with an alkyl group having 1 to 3 carbon atoms.

15. The non-aqueous electrolyte solution for a lithium secondary battery of claim 7, wherein the non-lithiated additive comprises at least one borate-based compound represented by Formula 3:

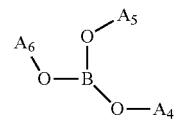

[Formula 3]

wherein, in Formula 3, $A_4$ to $A_6$ are each independently $-Si(R_c)_m(R_d)_{3-m}$, or a propynyl group ($-C\equiv C$), wherein $R_c$ and $R_d$ are each independently an alkyl group having 1 to 4 carbon atoms, and m is an integer of 0 to 3.

16. The non-aqueous electrolyte solution for a lithium secondary battery of claim 7, wherein the lithiated additive comprises at least one boron halide-based lithium selected from the group consisting of lithium tetrafluoro borate, lithium tetrachloro borate, lithium chlorotrifluoro borate, lithium trichlorofluoro borate, and lithium dichlorodifluoro borate.

17. The non-aqueous electrolyte solution for a lithium secondary battery of claim 7, wherein the lithiated additive comprises at least one boron oxalate-based lithium selected from the group consisting of lithium bis(oxalato)borate, lithium difluoro(oxalato)borate, and lithium dichloro(oxalato)borate.

18. The non-aqueous electrolyte solution for a lithium secondary battery of claim 7, wherein the lithiated additive comprises at least one phosphate-based lithium selected from the group consisting of lithium dihalo phosphate, lithium dialkyl phosphate, lithium dihalo(bisoxalato) phosphate, and lithium dialkyl(bisoxalato) phosphate, wherein the dihalo refers to two halogen substituents, which are each independently F or Cl, and the dialkyl refers to two alkyl substituents, which are each independently an alkyl group having 1 to 3 carbon atoms.

19. The non-aqueous electrolyte solution for a lithium secondary battery of claim 4, wherein the lithium salt comprises $Li^+$ as a cation, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion.

20. The non-aqueous electrolyte solution for a lithium secondary battery of claim 4, wherein the organic solvent comprises at least one selected from the group consisting of an ether-based solvent, an ester-based organic solvent, and an amide-based organic solvent.

* * * * *